United States Patent Office 3,423,236
Patented Jan. 21, 1969

3,423,236
ADDUCTS OF SILICON HYDRIDE POLY-
SILOXANES AND SILANES HAVING
ALKENYL RADICALS
George J. Quaal, Springfield, Mass., assignor to Dow
Corning Corporation, Midland, Mich., a corporation of
Michigan
No Drawing. Filed Oct. 9, 1964, Ser. No. 402,941
U.S. Cl. 117—161                                9 Claims
Int. Cl. D06m 15/66; C09k 3/18

ABSTRACT OF THE DISCLOSURE

A process rendering substrates water repellent by treating with a mixture of a catalyst and a siloxane copolymer and thereafter curing at 30° to 260° C. is described. The siloxane copolymer has a general formula:

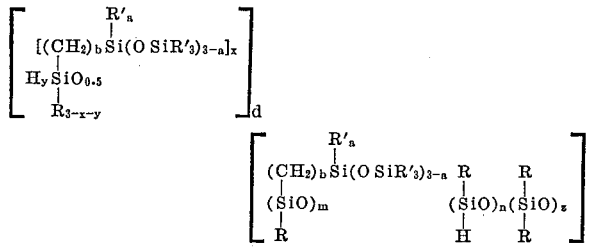

wherein R and R' are each alkyl or phenyl or their halogenated derivatives, $a$ is 0 to 2, $b$ is 2 to 4, $m$ is 2 to 99 mol percent of the silicon atoms, $z$ is 0 to 97 mol percent of the silicon atoms, $m+n+z$ is 6 to 2000, $x$, $y$ and $d$ are each 0 to 2 and $x+y$ is 0 to 2. The substrates include fabric, paper, glass, leather wood and masonry products among others.

---

This invention relates to siloxane copolymers which have silicon-bonded hydrogen atoms and silicon containing moieties bonded to the silicon atoms of the siloxane copolymer chain through alkylene radicals. The silicon-containing moieties have triorganosilyl groups.

An object of the present invention is to provide siloxane copolymers from silicon hydride siloxane polymers and alkenyl containing silanes.

Another object is to provide a siloxane copolymer which is curable with a catalyst.

Another object is to provide a siloxane copolymer which is a water repellent.

Other objects and advantages will become apparent from the following detailed description of the present invention and the appended claims.

This invention relates to a siloxane copolymer of the general formula

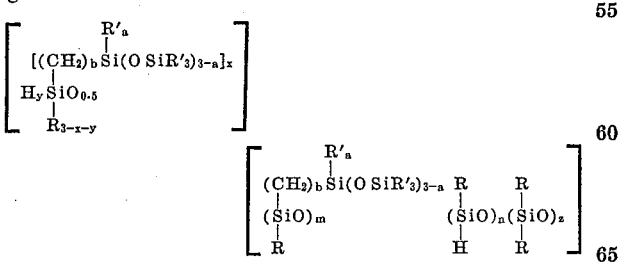

wherein R is a monovalent selected from the group consisting of alkyl radicals having from 1 to 12 inclusive carbon atoms, halogenated alkyl radicals having from 3 to 12 inclusive carbon atoms, phenyl radicals and halogenated phenyl radicals, R' is a monovalent radical selected from the group consisting of alkyl radicals having from 1 to 6 inclusive carbon atoms, halogenated alkyl radicals having from 3 to 6 inclusive carbon atoms, phenyl radicals and halogenated phenyl radicals, $a$ has an average value of from 0 to 2 inclusive, $b$ has a value from 2 to 4 inclusive, $m$ has a value such that at least 2 mol percent of the silicon atoms have at least one —$(CH_2)_bSiR'_a(OSiR'_3)_{3-a}$ radical and not more than 99 mol percent of the silicon atoms have at least one —$(CH_2)_bSiR'_a(OSiR'_3)_{3-a}$ radical, $n$ has a value such that at least one mol percent of the silicon atoms have at least one hydrogen atom bonded to a silicon atom and not more than 98 mol percent of the silicon atoms have at least one hydrogen atom bonded to a silicon atom, $z$ has an average value of from 0 to a maximum value which is such that not more than 97 mol percent of the silicon atoms have two R radicals per silicon atom, the sum of $m+n+z$ is from 6 to 2,000, $x$ has an average value of from 0 to 2 inclusive, $y$ has an average value of from 0 to 2 inclusive, the sum of $x+y$ is from 0 to 2 inclusive and $d$ has a value of from 0 to 2 inclusive.

The siloxane copolymers of this invention can be either linear siloxanes, cyclic siloxanes or mixtures of linear siloxanes and cyclic siloxanes. The cyclic siloxanes can be composed of 2 to 99 mol percent of siloxane units of the unit formula

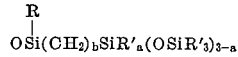

1 to 98 mol percent of siloxane units of the unit formula

and 0 to 97 mol percent of siloxane units of the unit formula $R_2SiO$. The mol percent is based on the total mols of siloxane units present in the composition. One mole of a siloxane unit is equal to the formula weight of the siloxane unit. Other units besides those discussed above can be present in small amounts such siloxane units as $OSi[(CH_2)_bSiR'_a(OSiR'_3)_{3-a}]_2$, $H_2SiO$, $HSiO_{1.5}$, and $RSiO_{1.5}$ are within the scope of the present invention. The linear siloxanes can be composed of the same units as the cyclic siloxanes, namely 2 to 99 mol percent of siloxane units of the unit formula

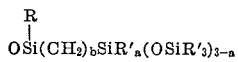

1 to 98 mol percent of siloxane units of the unit formula

and 0 to 97 mol percent of siloxane units of the unit formula $R_2SiO$. The linear siloxanes are terminated by siloxane units of the unit formula

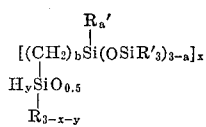

The linear siloxanes are the preferred siloxanes of this invention. The siloxanes of this invention can also be a mixture of linear and cyclic polysiloxanes. These mixtures can have an average formula

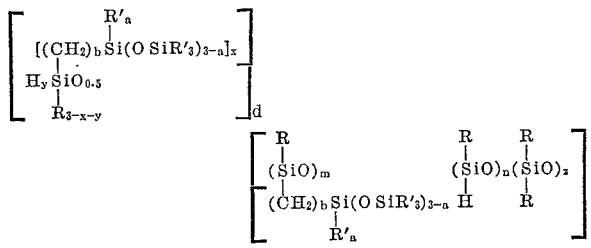

wherein $d$ will vary from 0 to 2. When $d$ is 0, the polysiloxane copolymers are essentially cyclic polysiloxanes and when $d$ is 2, the siloxane copolymers are essentially linear polysiloxanes. When the value of $d$ is between 0 and 2, the siloxane copolymers contain both linear polysiloxanes and cyclic polysiloxanes in a ratio as indicated by $d$. Both the cyclic and linear siloxanes can be polymerized in a random or block structure.

The siloxane copolymers of this invention must contain both

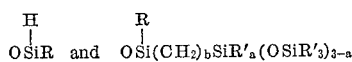

units. In these units R is a monovalent radical such as alkyl radicals having from 1 to 12 carbon atoms such as methyl, ethyl, propyl, pentyl, hexyl, octyl, dodecyl, cyclopentyl, cyclohexyl radicals, halogenated alkyl radicals having from 3 to 12 carbon atoms such as 3,3,3-trifluoropropyl, bromohexyl, chlorocyclohexyl and 3,3,4,4,5,5,6,6,7,7,8,8,8-tridecafluorooctyl radicals, phenyl radicals and halogenated phenyl radicals such as dichlorophenyl, fluorophenyl and bromophenyl radicals. In these units, R' is a monovalent radical such as alkyl radicals having from 1 to 6 carbon atoms such as methyl, ethyl, propyl, butyl, hexyl, cyclopentyl and cyclohexyl, halogenated alkyl radicals having from 3 to 6 carbon atoms such as 3,3,3-trifluoropropyl and bromocyclopentyl radicals, phenyl radicals and halogenated phenyl radicals such as chlorophenyl, dibromophenyl and fluorophenyl radicals. The preferred radicals for R and R' are methyl radicals.

In the

units, $a$ is 0, 1 or 2, preferably $a$ is 0 or 1. The siloxane copolymer must have at least 1 triorganosilyl group. Thus, $a$ cannot be more than 2. The alkylene radicals can be ethylene, propylene or butylene radicals. Thus $b$ is 2, 3 or 4, preferably $b$ is 2.

Examples of the above units are

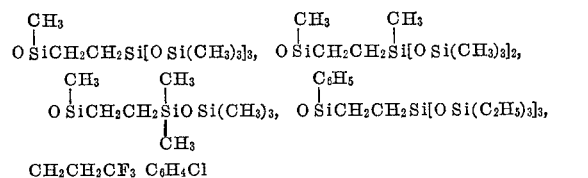
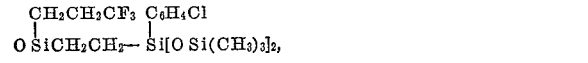
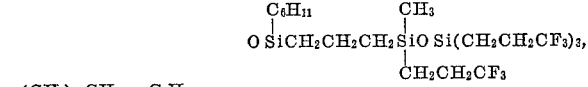
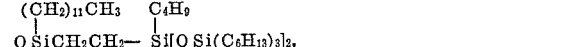
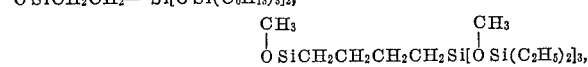
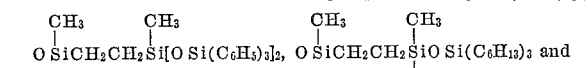

Examples of

units are

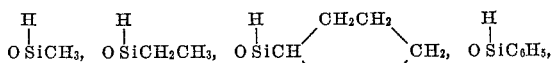

$$O\overset{H}{\underset{|}{Si}}CH_2(CH_2)_6CH_3 \text{ and } O\overset{H}{\underset{|}{Si}}CH_2CH_2C_6F_{13}$$

In the $R_2SiO$ units, the R is defined above. Examples of $R_2SiO$ units are $(CH_3)_2SiO$, $(CH_3)(CH_3CH_2)SiO$, $(C_6H_5)_2SiO$, $(C_6H_5)(CH_3)SiO$, $(CF_3CH_2CH_2)(CH_3)SiO$, $(C_6H_{11})(CH_3)SiO$, $(C_6H_5)(CH_3CH_2)SiO$, $$(CH_3CH_2)_2SiO$$

$(C_6H_4Cl)_2SiO$, $[CH_3(CH_2)_{11}](CH_3)SiO$ and $$[CH_3(CH_2)_5]_2SiO$$

The terminating siloxane units of the linear siloxanes have the unit formula

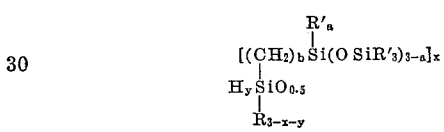

In the terminating siloxane units the $$-(CH_2)_bSiR'_a(OSiR'_3)_{3-a}$$

and R are fully defined above. The terminating siloxane units have at least one R radical per unit and can have up to 3 R radicals per unit. The terminating siloxane unit can also have up to 2 hydrogen atoms bonded directly to the silicon atom. Thus, $y$ can have a value from 0 to 2. The terminating siloxane unit can also have up to two $-(CH_2)_bSiR'_a(OSiR'_3)_{3-a}$ radicals. Thus, $x$ can have a value from 0 to 2. The sum of $x+y$ can vary from 0 to 2 depending upon the average number of hydrogen atoms and $-(CH_2)_bSiR'_a(OSiR'_3)_{3-a}$ radicals attached to the silicon atom of the terminating siloxane unit. Examples of terminating siloxane units are $(CH_3)_3SiO_{0.5}$, $H(CH_3)_2SiO_{0.5}$, $H_2(CH_3)SiO_{0.5}$, $$(CH_3)_2SiO_{0.5}$$
$$|$$
$$CH_2CH_2Si[OSi(CH_3)_3]_3$$

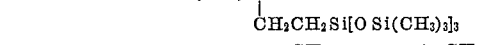
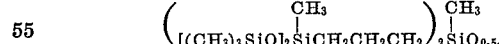
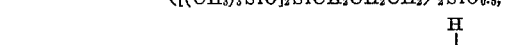
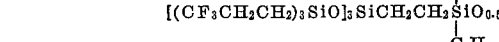

The siloxane copolymers of this invention can be relatively low molecular weight polymers consisting of at least 6 siloxane units or relatively high molecular weight polymers consisting of up to 2,000 siloxane units. The siloxane copolymers with less than 6 siloxane units do not cure to usable products and those having more than 2,000 siloxane units are not economical to prepare. The most preferred siloxane copolymers contain from 10 to 200 siloxane units. The siloxane copolymers can be prepared by adding a silane of the formula $$CH_2=(CH_2)_e SiR'_a(OSiR'_3)_{3-a}$$

where R' and a are defined above and e has a value of 0, 1 or 2, to a mixture of a platinum catalyst and a silicon hydride polysiloxane of the unit formula $$[H_y SiO_{0.5}]_d[(\underset{R}{\overset{R_{3-y}}{Si}}O)_p(\underset{R}{\overset{H}{Si}}O)_z]$$

where R, y, z and d are defined above and p has a value such that at least 3 mol percent of the silicon atoms have at least one hydrogen atom bonded to a silicon atom.

The silanes operable in this procedure are well known in the art. Examples of these silanes are

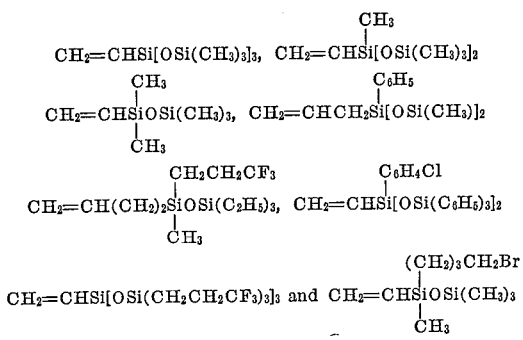

$$CH_2=CHSi[OSi(CH_3)_3]_3, \quad CH_2=CH\underset{CH_3}{\overset{CH_3}{Si}}[OSi(CH_3)_3]_2$$

$$CH_2=CH\underset{CH_3}{\overset{CH_3}{Si}}OSi(CH_3)_3, \quad CH_2=CHCH_2\underset{}{\overset{C_6H_5}{Si}}[OSi(CH_3)_3]_2$$

$$CH_2=CH(CH_2)_2\underset{CH_3}{\overset{CH_2CH_2CF_3}{Si}}OSi(C_2H_5)_3, \quad CH_2=CH\underset{}{\overset{C_6H_4Cl}{Si}}[OSi(C_6H_5)_3]_2$$

$$CH_2=CHSi[OSi(CH_2CH_2CF_3)_3]_3 \text{ and } CH_2=CH\underset{CH_3}{\overset{(CH_2)_3CH_2Br}{Si}}OSi(CH_3)_3$$

The silicon hydride polysiloxanes, operable in this procedure can be obtained commercially and are well known in the art. Examples of the silicon hydride polysiloxanes are

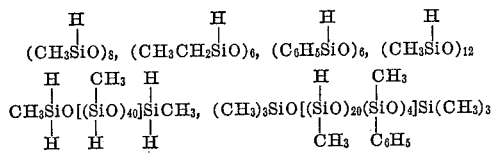

$$(CH_3\overset{H}{Si}O)_8, \quad (CH_3CH_2\overset{H}{Si}O)_6, \quad (C_6H_5\overset{H}{Si}O)_6, \quad (CH_3\overset{H}{Si}O)_{12}$$

$$CH_3\overset{H}{\underset{H}{Si}}O[(\overset{CH_3}{\underset{H}{Si}}O)_{40}]\overset{H}{\underset{H}{Si}}CH_3, \quad (CH_3)_3SiO[(\overset{H}{\underset{CH_3}{Si}}O)_{20}(\overset{CH_3}{\underset{C_6H_5}{Si}}O)_4]Si(CH_3)_3$$

and any other combination of siloxane units such as

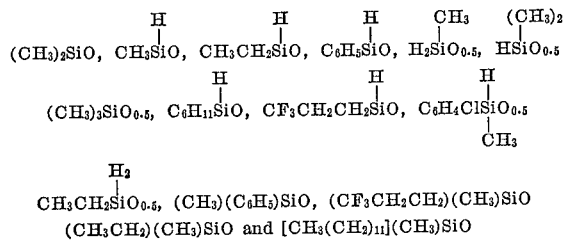

$$(CH_3)_2SiO, \quad CH_3\overset{H}{Si}O, \quad CH_3CH_2\overset{H}{Si}O, \quad C_6H_5\overset{H}{Si}O, \quad H_2SiO_{0.5}, \quad \overset{CH_3}{\underset{}{H}}\overset{(CH_3)_2}{SiO_{0.5}}$$

$$(CH_3)_3SiO_{0.5}, \quad C_6H_{11}\overset{H}{Si}O, \quad CF_3CH_2CH_2\overset{H}{Si}O, \quad C_6H_4Cl\overset{H}{\underset{CH_3}{Si}}O_{0.5}$$

$$CH_3CH_2\overset{H_2}{Si}O_{0.5}, \quad (CH_3)(C_6H_5)SiO, \quad (CF_3CH_2CH_2)(CH_3)SiO$$

$$(CH_3CH_2)(CH_3)SiO \text{ and } [CH_3(CH_2)_{11}](CH_3)SiO$$

The platinum catalyst can be in any form which is not basic in nature such as platinum on charcoal and platinum on alumina. Any platinum catalyst which is basic will reduce the yield of product and will produce polymers other than those described by this invention. A mixture of platinum catalyst and silicon hydride polysiloxane is usually preheated to a temperature of 110° to 160° C., preferably 120° to 150° C. before the addition of the silane. These preheating temperatures are not critical. The mixture need not be preheated before the addition of the silane but because the reaction is usually exothermic and substantially begins at about 110° to 120° C., preheating is advantageous. When small quantities of silane is used, preheating is usually not necessary but as larger quantities are used, preheating becomes very desirable. The reaction is vigorous and the silanes being relatively low boiling can cause the system to build up pressure and/or cause flooding of the system. The silanes are thus usually added at a rate which is inversely proportional to the quantity of silane to be added. The silane need not be added to the polysiloxane. The polysiloxane can be added to the silane. The mixture is usually agitated during the addition.

After the addition is completed, the mixture is raised to a temperature of 200° to 220° C. to insure completion of the reaction and then cooled to room temperature or to some temperature less than 200° C. when the reaction is to be vacuum stripped.

The best results are obtained when the system is blanketed with an inert gas such as nitrogen. Some oxidation can occur at these reaction temperatures although systems in which an inert gas is not used usually have an insignificant amount of oxidation. The silane and silicon hydride polysiloxane do not require a solvent for carrying out the reaction but an organic solvent can be used. When the silicon hydride polysiloxane is of a high molecular weight, a solvent solution of the silicon hydride polysiloxane and/or silane is particularly advantageous as the viscosity of the system will be reduced and handling properties are improved. The organic solvent should permit the temperature of reaction to be reached. The higher temperatures can be reached either with higher boiling solvents or by using pressure. Examples of some operable organic solvents are toluene, xylene, naphtha, organic esters such as butyl acetate, 2-ethylhexyl acetate, acetate of ethylene glycol monomethylether, acetate of ethylene glycol monobutyl ether and organic ketones such as methylethyl ketone and methylhexyl ketone.

After the reaction mixture has cooled to room temperature or to the stripping temperature, any remaining unreacted silanes and/or solvent can be removed by heat and vacuum. The catalyst can be removed by any suitable means, such as filtering.

The siloxane copolymers of this invention have excellent shelf stabilities. These siloxanes have stable viscosities when stored with or without solvent over long periods of time. These siloxanes can also be made into stable emulsions. The siloxane copolymers of this invention cannot be stored with a curing catalyst, thus they form a two component system for curing. The curing catalyst is added just before use. The siloxane copolymers of this invention can be used as water repellents. The siloxane copolymers are superior water repellents for fabrics and can be applied to fabrics from an organic solvent solution, an aqueous emulsion and a consumer aerosol package. All of these applications provide fabrics with good water repellency when cured with a catalyst at a temperature of from 30° C. to 260° C. The water repellency produced on the fabric is durable and can withstand several washings. The water repellency of a fabric which has lost some of its effectiveness can readily be renewed by any of the above treatments.

The siloxane copolymer used as a water repellent can be applied from a solvent solution using organic solvents such as toluene, perchloroethylene, hexane, acetone, isopropanol, ethanol and methanol. The fabric can be made water repellent by dipping in the solvent solution of the siloxane copolymer. The solvent solution of the siloxane copolymer can be brushed on the fabric or applied in any other conventional manner. The amount of pickup of siloxane copolymer is preferably from 1 to 10 weight percent with from 1 to 3 weight percent being more commercially desirable.

The siloxane copolymer can also be applied to fabrics to provide water repellency from aqueous emulsions. The emulsions can be prepared in any conventional manner using nonionic, anionic or cationic surfactants. The nonionic surfactants are preferred. The most preferred surfactants are the reaction product of ethylene oxide and acetylenic glycol known as Sulfynol 465 made by Air Reduction Chemical Co. and trimethylnonyl polyethylene glycol ether known as Tergitol TMN–6. The emulsion can be prepared to contain a wide concentration of siloxane copolymer. The most preferred concentration is from 5 to 40 weight percent siloxane copolymer. The emulsion can be applied to the fabric in any conventional manner. The fabric can be immersed in an emulsion, removed and dried. The water repellency is usually good when the amount of siloxane copolymer pickup by the fabric is from 0.5 to 10 weight percent with from 0.5 to 3 weight percent being more commercially desirable.

The siloxane copolymer can be applied to fabrics to provide water repellency by spraying from aerosol packages. The siloxane copolymer can be put into any conventional type of aerosol package. The siloxane copolymer can be in any suitable organic solvent usually used with aerosol spray such as chlorothene, or perchloroethylene. Conventional spray propellants such as dichlorodifluoromethane, Freon 12, can be used. The amount of siloxane copolymer in the solvent solution is preferably from 1 to 20 weight percent. A spray of from 2 to 60 seconds over an area of 0.2 to 0.6 square feet provides a fabric with good water repellent properties. Usually only from 2 to 30 seconds is sufficient to provide maximum protection.

The siloxane copolymers are useful for making fabrics water repellent such as cotton, sateen, viscose, glass, nylon, Dacron, acetate, arnel, cellulose triacetate, polyacrylonitrile (Orlon), synthetic polyesters of terephthalic acid and ethylene glycol, copolymers of acrylonitrile and vinylidene chloride (Dynel), copolymers of vinyl chloride and vinylidene chloride, copolymers of vinyl acetate and vinyl chloride, wool and linen.

The siloxane copolymers are also useful as water repellents for paper, glass, leather, wood, masonry products and other substrates. The siloxane copolymers of this invention can also be used as lubricants and as hydrophobic fluids.

The most preferred siloxane copolymers of this invention are those containing from 25 to 75 mol percent of siloxane units of the unit formula

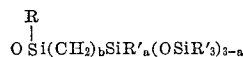

and from 25 to 75 mol percent of siloxane units of the unit formula

These siloxanes are particularly useful as water repellents for fabrics. The most preferred siloxanes are those in which the sum of $m+n+z$ is from 10 to 200.

The siloxane copolymers can be cured to durable films by catalyst selected from the group consisting essentially of amines, aminoorganosilicon compounds, metal carboxylates, organic esters of titanium and zirconium and alkyl tin carboxylates. The siloxane copolymers are cured by heating at temperatures from 30° to 260° C., preferably from 65° to 205° C. The amines which are operable are those such as primary amines, secondary amines and tertiary amines. These organic amines are well known to the art and can be obtained commercially. The aminoorganosilicon compounds can be silanes or siloxanes such as (CH$_3$O)$_3$SiCH$_2$CH$_2$CH$_2$NHCH$_2$CH$_2$NH$_2$ (CH$_3$)$_3$SiCH$_2$CH$_2$CH$_2$NH$_2$

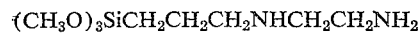

siloxane polymers having units such as

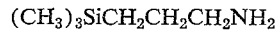

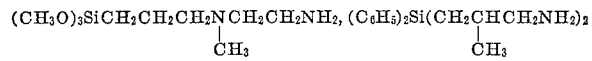

and

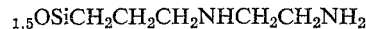

Examples of metal carboxylates which are operable in this invention are such as cadmium octoate, cadmium acetate, zinc octoate, potassium acetate, lead stearate, cobalt octoate, cobalt naphthenate, magnesium octoate, lead octoate, magnesium naphthenate and lead hexoate. Examples of organic esters of titanium and zirconium are tetraethyltitanate, tetraisopropyltitanate, tetraisopropylzirconate, tetraoctyltitanate, tetraoctadecylzirconate, octylene glycol titanate, glycerol titanate, triethanolamine titanate, titanium lactate and zirconium lactate. Examples of the alkyl tin carboxylates are diethyltin diacetate, tributyltin propionate, dibutyltin dilactate, butyltin trioctoate, trioctadecyltin diacetate, trimethyltin stearate, dibutyltin dibenzoate and dibutyltin diacetate. The catalyst can be used in amounts normally used in curing siloxane systems such as from 0.01 to 10 weight percent based on the total weight of the siloxane copolymer.

The following examples are illustrative only and should not be construed as limiting the invention which is properly delineated in the appended claims.

Example 1

A mixture of 60 grams of a trimethylsilyl endblocked methylhydrogenpolysiloxane having a viscosity of 32.9 cs. at 25° C., 180 grams of

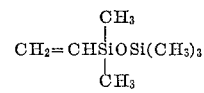

and 0.2 gram of a mixture of one weight percent platinum on charcoal was heated to 180° C. and allowed to reflux for 2.5 hours. The mixture was then cooled to room temperature and filtered twice by vacuum through an exceptionally pure diatomaceous silica, known as Super-Cel made by Celite. The product contained 73.7 mol percent of

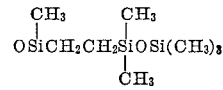

units and about 26.3 mol percent of

units and had a viscosity of 3,369 cs. at 25° C.

A solution of 3.5 g. of the above siloxane copolymer, 120 ml. of perchloroethylene and 0.3 g. of

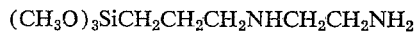

was applied to tan sateen by dipping the fabric into the solution and then padding. The treated fabric was air dried and thereafter cured for 3 minutes at 176° C. The treated fabric showed a spray rating of 100. The water repellency of the cured fabric was determined by using the spray rating test as defined by ASTM D–583–58 or the spray test of AATCC Standard Test Method 22–1961.

Example 2

A mixture of 76.4 g. of CH$_2$=CHSi[OSi(CH$_3$)$_3$]$_3$ and 0.1 g. of a mixture of 1 weight percent platinum on charcoal was placed in a 500 ml. flask equipped with a dropping funnel, an agitator and a reflux condenser and then heated to 120° C. At 120° C. a trimethylsilyl endblocked methylhydrogenpolysiloxane was slowly added to the silane mixture. After the polysiloxane was added the mixture was refluxed for 6 hours at 200° C. The mixture was cooled to room temperature and 100 ml. of toluene was added. The product was filtered through an exceptionally pure diatomaceous silica. The filtered product was stripped up to 165° C. at 5 mm. Hg. The product had 98.9 mol percent of $$O\underset{\underset{CH_3}{|}}{Si}CH_2CH_2Si[OSi(CH_3)_3]_3$$

units and about 1.1 mol percent $$CH_3\underset{\underset{H}{|}}{Si}O$$

units having a viscosity of 21,180 cs. at 25° C.

A solution of 120 ml. of perchloroethylene, 3 g. of the above siloxane copolymer and 0.3 g. of $$(CH_3O)_3SiCH_2CH_2CH_2NHCH_2CH_2NH_2$$

was applied to 80 x 80 cotton print fabric by dipping and then padding. The treated fabric was air dried and then cured for 3 minutes at 176° C. A spray rating of 100 was obtained as determined by the procedure of Example 1.

Example 3

The durability of the water repellent treatment on the fabrics was determined by observing the water repellent properties as indicated by the spray rating after a specified number of launderings. The treated fabrics were laundered in a Westinghouse Automatic Home Washer with a 40-minute wash cycle, followed by drying in a Westinghouse Home Tumbler Drier with a 20-minute cycle. Each washing and drying was considered as one laundering cycle. The washing medium consisted of about 8 gallons of 71° C. water and 8 g. of a commercial anionic washing detergent. Each piece of tan sateen was treated with a solution of the siloxane copolymers as described in Example 1. The spray ratings were determined before laundering and after 1, 3 and 5 laundering cycles, as shown in the following table.

| Siloxane copolymer | Initial spray rating | Spray ratings after— | | |
|---|---|---|---|---|
| | | 1 laundering | 3 launderings | 5 launderings |
| Example 1 | 100 | 80–90 | 70 | 70 |
| Example 2 | 100 | 80 | 70 | 70 |

Example 4

When the following silanes and silicon hydride polysiloxanes in the indicated ratios are reacted according to the procedure of Example 1, siloxane copolymers are obtained.

| | Silane | Silicon hydride polysiloxane | Moles of silane per molecular weight of silicon hydride polysiloxane |
|---|---|---|---|
| 1 | $CH_2=CHCH_2\underset{\underset{CH_3}{|}}{\overset{\overset{CH_3}{|}}{Si}}-O\,Si(CH_3)_3$ | $H_2SiO[(\underset{\underset{CH_3}{|}}{\overset{\overset{H}{|}}{Si}}O)_6(\underset{\underset{CH_3}{|}}{\overset{\overset{CH_2CH_3}{|}}{Si}}O)_{194}]\underset{}{\overset{\overset{CH_3}{|}}{Si}}H_2$ | 2 |
| 2 | $CH_2=CH\underset{}{\overset{\overset{C_6H_5}{|}}{Si}}[O\,Si(C_2H_5)_3]_2$ | $CH_3\underset{}{\overset{\overset{(C_6H_5)_2H}{|}}{Si}}O[(\underset{\underset{CH_3}{|}}{\overset{\overset{CH_3}{|}}{Si}}O)_{50}(\underset{\underset{CH_3}{|}}{\overset{\overset{(C_6H_5)_2}{|}}{Si}}O)_{25}]SiCH_3$ | 30 |
| 3 | $CH_2=CH\underset{\underset{CH_3}{|}}{\overset{\overset{CH_2CH_2CF_3}{|}}{Si}}-O\,Si(CH_2CH_2CF_3)_3$ | $H_2SiO[(\underset{\underset{H}{|}}{\overset{\overset{C_6H_5}{|}}{Si}}O)_{40}-(\underset{\underset{CH_3}{|}}{\overset{\overset{CH_2CH_2CF_3}{|}}{Si}}O)_4]-\underset{}{\overset{\overset{CH_2CH_2CF_3C_6H_5}{|}}{Si}}H_2$ | 10 |
| 4 | $CH_2=CH(CH_2)_2Si[O\,\overset{\overset{C_6H_5}{|}}{Si}(CH_3)_2]_3$ | $[(\underset{\underset{CH_3}{|}}{\overset{\overset{H}{|}}{Si}}O)_9]$ | 4 |
| 5 | $CH_2=CHCH_2\underset{}{\overset{\overset{CH_3}{|}}{Si}}[O\,Si(CH_3)_3]_2$ | $(CH_3)_3SiO\,(\underset{\underset{CH_3}{|}}{\overset{\overset{H}{|}}{Si}}O)_{2000}Si(CH_3)_3$ | 40 |
| 6 | $CH_2=CH\,Si[O\,Si(C_4H_8Br)_3]_3$ | $CH_3\underset{\underset{C_6H_5}{|}}{\overset{\overset{H}{|}}{Si}}O[(\underset{\underset{H}{|}}{\overset{\overset{CH_2CH_3}{|}}{Si}}O)_{200}]\underset{\underset{C_6H_5}{|}}{\overset{\overset{H}{|}}{Si}}-CH_3$ | 198 |
| 7 | $CH_2=CH\,\underset{}{\overset{\overset{C_6H_{11}}{|}}{Si}}[O\,Si(CH_2CH_2CH_3)_3]_2$ | $(CH_3)_3SiO[(\underset{\underset{C_6H_5}{|}}{\overset{\overset{H}{|}}{Si}}O)_{20}(\underset{\underset{C_6H_5}{|}}{\overset{\overset{CH_3}{|}}{Si}}O)_5]Si(CH_3)_3$ | 4 |
| 8 | $CH_2=CH\underset{\underset{CH_3}{|}}{\overset{\overset{C_6H_5C_6H_5}{|}}{Si}}O-\underset{\underset{CH_2CH_2CF_3}{|}}{\overset{\overset{}{|}}{Si}}CH_2CH_3$ | Siloxane copolymer composed of— $20$ mol percent $CH_3\overset{\overset{H}{|}}{Si}O$ units, $20$ mol percent $C_6H_4Cl\overset{\overset{H}{|}}{Si}O$ units, $20$ mol percent $CH_3CH_2\overset{\overset{H}{|}}{Si}O$ units, $20$ mol percent $(CH_3)_2SiO$ units, $10$ mol percent $CH_3(CH_2)_5\overset{\overset{CH_3}{|}}{Si}O$ units, $10$ mol percent $(CH_3)_3SiO_{0.5}$ units. | (¹) |

¹ 15 mol percent.

Example 5

When a perchloroethylene solution of the siloxane copolymer of Example 2 is applied to paper, glass, leather, wood and concrete blocks, a water repellent product is formed when cured at 205° C. for 2 minutes.

Example 6

When an emulsion is prepared from water, toluene, a nonionic surfactant, the siloxane copolymer of Example 4, No. 3 and titanium lactate and is applied to concrete building blocks and then heated to 260° C. for 5 minutes, a water repellent product is formed.

Example 7

When hexylamine, diethylamine, zinc octoate, tetraisopropylzirconate, triethanolamine titanate, dibutyltin dilactate, dibutyltin diacetate or cobalt naphthenate is substituted for $(CH_3O)_3SiCH_2CH_2CH_2NHCH_2CH_2NH_2$ in Example 1, equivalent results are obtained.

Example 8

When paper is sprayed with a mist from a consumer aerosol package wherein the mist consists of the siloxane copolymer of Example 4, No. 5, chlorothene, dichlorodifluoromethane, and dibutyltin diacetate, a water repellent paper is obtained when cured for 10 minutes at 65° C.

That which is claimed is:

1. In a process for rendering a substrate water repellent, the improvement comprising treating said substrate with a mixture of
a siloxane copolymer of the general formula:

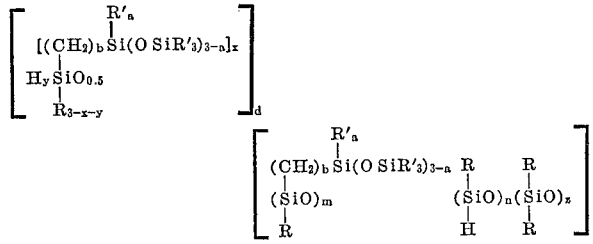

wherein
R is a monovalent radical selected from the group consisting of alkyl radicals having from 1 to 12 inclusive carbon atoms, halogenated alkyl radicals having from 3 to 12 inclusive carbon atoms, phenyl radicals and halogenated phenyl radicals,
R' is a monovalent radical selected from the group consisting of alkyl radicals having from 1 to 6 inclusive carbon atoms, halogenated alkyl radicals having from 3 to 6 inclusive carbon atoms, phenyl radicals and halogenated phenyl radicals,
$a$ has an average value of from 0 to 2 inclusive,
$b$ has a value from 2 to 4 inclusive,
$m$ has a value such that at least 2 mol percent of the silicon atoms have at least $$-(CH_2)_bSiR'_a(OSiR'_3)_{3-a}$$

radical and not more than 99 mol percent of the silicon atoms have at least one $$-(CH_2)_bSiR'_a(OSiR'_3)_{3-a}$$

radical,
$n$ has a value such that at least 1 mol percent of the silicon atoms have at least one hydrogen atom bonded to a silicon atom and not more than 98 mol percent of the silicon atoms have at least one hydrogen atom bonded to a silicon atom,
$z$ has an average value of from 0 to a maximum value which is such that not more than 97 mol percent of the silicon atoms have 2 R radicals per silicon atom,
the sum of $m+n+z$ is from 6 to 2000,
$x$ has an average value of from 0 to 2 inclusive,
$y$ has an average value of from 0 to 2 inclusive,
the sum of $x+y$ is from 0 to 2 inclusive and
$d$ has a value of from 0 to 2 inclusive, and
a curing catalyst and thereafter curing at a temperature of from 30° to 260° C.

2. The process in accordance with claim 1 wherein the treated substrate is cured by heating to from 65° to 205° C.

3. The process in accordance with claim 1 wherein the substrate is treated with a solution comprising the siloxane copolymer, an organic solvent and a curing catalyst selected from the group consisting of organic amines, aminoorganosilicon compounds, metal carboxylates, alkyl tin carboxylates, organic esters of titanium and organic esters of zirconium.

4. The process in accordance with claim 1 wherein the substrate is treated with an aqueous emulsion comprising the siloxane copolymer, an organic solvent, a surfactant, water and a curing catalyst selected from the group consisting of organic amines, aminoorganosilicon compounds, metal carboxylates, alkyl tin carboxylates, organic esters of titanium and organic esters of zirconium.

5. The process in accordance with claim 1 wherein the substrate is treated with a mist comprising the siloxane copolymer, an organic solvent and a curing catalyst selected from the group consisting of organic amines, aminoorganosilicon compounds, metal carboxylates, alkyl tin carboxylates, organic esters of titanium and organic esters of zirconium.

6. The process in accordance with claim 1 wherein the substrate is a fabric.

7. The process in accordance with claim 1 wherein the substrate is a fabric and the fabric is treated by immersing in the aqueous emulsion comprising water, the siloxane copolymer, a surfactant and a curing catalyst selected from the group consisting of organic amines, aminoorganosilicon compounds, metal carboxylates, alkyl tin carboxylates, organic esters of titanium and organic esters of zirconium.

8. The process in accordance with claim 3 wherein the substrate is a fabric and the fabric is treated by immersing in the solution.

9. The process in accordance with claim 5 wherein the substrate is a fabric and the fabric is treated by spraying with the mist from an aerosol spray package.

References Cited

UNITED STATES PATENTS

| | | | |
|---|---|---|---|
| 2,588,365 | 3/1952 | Dennett | 117—161 |
| 2,588,366 | 3/1952 | Dennett | 117—161 |
| 2,774,690 | 12/1956 | Cockett et al. | 117—161 |
| 2,807,601 | 9/1957 | Dennett | 117—161 |
| 2,833,022 | 5/1958 | Collings | 117—161 |
| 2,895,853 | 7/1959 | Bailey et al. | 117—161 |
| 2,905,703 | 9/1959 | Bailey et al. | 117—161 |
| 3,065,111 | 11/1962 | Reeves et al. | 117—135.5 |

WILLIAM D. MARTIN, *Primary Examiner.*

THEODORE G. DAVIS, *Assistant Examiner.*

U.S. Cl. X.R.

117—123, 138.8, 140, 141, 142, 143, 145, 148, 155; 260—29.2, 46.5